United States Patent Office 3,375,274
Patented Mar. 26, 1968

3,375,274
ALKYLENE BORAZINE POLYMERS
John P. Faust, Hamden, and Andrew J. Klanica, Cheshire, Conn., assignors to Olin Mathieson Chemical Corporation
No Drawing. Filed Nov. 20, 1964, Ser. No. 412,858
3 Claims. (Cl. 260—551)

This invention relates to novel alkylene borazine polymers and to the process of preparing them. The novel polymers have the formula:

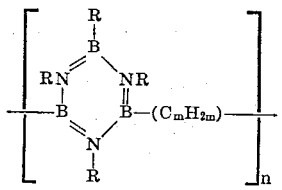

where nitrogen and boron are both 4-covalent, R is a lower alkyl of 1 to 5 carbons, $m$ is an integer from 1 to 12 and $n$ is an integer from 3 to 100. The alkylene borazine polymers of this invention have utility as neutron absorbers. They are also useful for impregnation of textiles to prevent afterglow when the textile is burned.

The alkylene borazine polymers of this invention are prepared by reacting an alkylene bis(magnesium halide), where the halide is the chloride, bromide or iodide, with a tetraalkyl borazine or a tetraalkyl dihaloborazine in an inert reaction medium. Suitable inert reaction media are those known for the preparation of Grignard reagents, for example, tertiary amines and the ethers, including the cyclic ethers, dioxane and tetrahydrofuran.

The preparation of the Grignard reagents is carried out at temperatures of, for example, from room temperature up to the boiling point of the particular reaction medium employed. Addition of the tetraalkyl borazine or tetraalkyl dihaloborazine to the bis-Grignard reagent is completed during a period of up to about 3 hours, for example, from about ½ to 2 hours. The reaction mixture is heated at a temperature of 30° to 100° C. for a period of several hours, suitably from 10 to 100 hours. After cooling to room temperature, any unconsumed Grignard reagent is removed by any suitable means, for example, addition of a cold, aqueous solution of ammonium chloride. Alternatively, the reaction mixture is filtered and the polymer recovered from the filtrate by distillation of the reaction medium from the polymer. The alkyl-borazine reactant used in this invention has the formula:

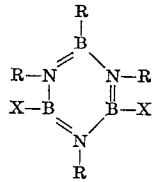

where nitrogen and boron are both 4-covalent, where X is hydrogen, chlorine, bromine or iodine and R is alkyl of 1 to 5 carbons.

Examples of suitable alkyl are methyl, ethyl, propyl, isopropyl, butyl, isobutyl, tert.-butyl and neopentyl. Examples of suitable alkyl dihaloborazines and alkyl borazines are:

B-ethyl-N,N',N''-trimethyl-B,B''-dichloroborazine,
B-isobutyl-N,N',N''-trimethyl-B',B''-dibromoborazine, and
B,N,N',N''-tetramethyl-B',B''-dichloroborazine, and
B,N,N',N''-tetramethyl borazine.

The alkylene bis(magnesium halides) are prepared in known manner from the alkylene dihalides where the halide is bromide, chloride or iodide and the alkylene dihalide contains 1 to 12 carbons. The alkylene chain can be straight or branched and the alkylene dihalide generally has the formula:

$$C_nH_{2n}X_2$$

where $n$ is 1 to 12 and X is chlorine, bromine or iodine. Examples of suitable alkylene dihalides are methylene chloride, 1,6-dibromohexane, 2,5-dibromohexane, trimethylene chlorobromide, 1,2-dichloropropane, 1,3-dichloropropane, 1,12-dibromododecane or 1,6-diiodohexane.

The method of this invention thus comprises heating a mixture of an alkyl borazine having the formula:

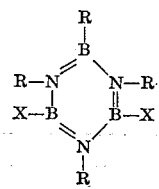

where X is hydrogen, chlorine, bromine or iodine and R is alkyl of 1 to 5 carbons with an alkylene bis(magnesium halide) containing 1 to 12 carbons, the halogen in said magnesium halide being selected from the group consisting of bromine, chlorine, and iodine in an inert reaction medium at 30° to 100° C. for 10 to 100 hours to form the alkylene borazine polymer and separating said polymer from said reaction medium.

Example

A 500 milliliter reaction flask and other equipment together with 4.0 grams (165 millimoles) of magnesium turnings were dried in a vacuum oven at 100° C. under 150 millimeters of mercury pressure for 2 hours. The reaction flask containing the magnesium was fitted with reflux condenser, gas inlet tube and stirrer. The assembly was evacuated and then filled to atmospheric pressure with dry nitrogen gas. The magnesium was covered with 10 milliliters of dry diethyl ether and a solution of 4.90 grams (20 millimoles) of 1,6-dibromohexane in 75 milliliters of dry ether to which was added a single crystal of iodine was added dropwise over a period of 45 minutes. The reactor contents were maintained at 40° to 45° C. After the addition was complete, the reactor contents were stirred at 40° C. for 3 hours.

A solution of 4.0 grams (19.5 millimoles) of B,N,N', N''-tetramethyl-B',B''-dichloroborazine in 300 milliliters of dry ether was added slowly with vigorous stirring during a period of 1 hour. The temperature of the reaction mixture was maintained at 40° C. After the addition was complete, the reactor contents were stirred at 40° C. for 66 hours.

The reactor contents were filtered and the filtrate was evaporated to remove ether leaving a viscous, tacky, light brown polymer as a residue. Elemental analysis of the polymer was as follows:

|     | Found | Calculated |
| --- | --- | --- |
| B   | 14.7 | 14.83 |
| N   | 15.8 | 19.21 |
| C   | 52.9 | 54.91 |
| H   | 10.9 | 11.06 |
| Cl  | 1.1  | 0.00  |

Molecular weight determination by analyses for the chlorine atom end groups shows a polymer chain of fifteen units, corresponding to a molecular weight of 3000.

The infrared spectrum of the polymer shows the characteristic B—N ring absorption at 7.2 microns. The borazine rings are thus intact in the polymer.

In addition nuclear magnetic resonance measurements show that the following structures are present in the polymer.

| Structures: | Number per polymer unit |
|---|---|
| $CH_3$—B | 1.1 |
| $CH_3$—N | 3.0 |
| —$CH_2$— | 7 to 8 |

From these data, the structure of this polymer was determined to be as represented in the first formula above. The molecular weight of 3000 corresponds to a value of 14.4 for $n$ in the above formula.

A solution in benzene containing 10% by weight of the polymer obtained above was prepared and strips of cotton print cloth, 2 cm. x 5 cm., were immersed in the solution. The strips were removed and dried under vacuum. The impregnated cloth strips were burned and the afterglow timed with a stop watch. The duration of afterglow was compared with the duration observed with identical strips of cloth treated with pure benzene and vacuum dried. The data are listed below.

| Sample No. | Duration of Afterglow, Seconds | |
|---|---|---|
| | Standard Cloth | Treated Cloth |
| 1 | 6 | 0 |
| 2 | 6 | 0 |
| 3 | 7 | 0 |

It is apparent the afterglow was completely eliminated.

What is claimed is:

1. An alkylene borazine polymer having the formula:

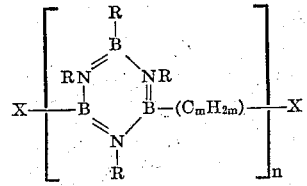

where X is a halogen selected from the group consisting of chlorine, bromine and iodine, R is alkyl of 1 to 5 carbons, $m$ is an integer from 1 to 12 and $n$ is an integer from 3 to 16.

2. An alkylene borazine polymer as claimed in claim 1 in which R is methyl.

3. An alkylene borazine polymer as claimed in claim 2 in which $m$ is 6.

References Cited

Seyforth et al.: Inorganic Chemistry, vol. 1, pp. 710–711 (1962).

Harris: A Study of the Synthesis of Some Derivatives of Borazene by Grignard Type Reactions, Ph.D. Thesis, U. of Florida (1958), pp. 23–26.

WALTER A. MODANCE, *Primary Examiner.*

H. I. MOATZ, *Assistant Examiner.*